US010083117B2

United States Patent
Feng et al.

(10) Patent No.: US 10,083,117 B2
(45) Date of Patent: Sep. 25, 2018

(54) FILTERING WRITE REQUEST SEQUENCES (71) Applicant: HUA ZHONG UNIVERSITY OF SCIENCE TECHNOLOGY, Wuhan, Hubei (CN)

(72) Inventors: Dan Feng, Hubei (CN); Wen Zhou, Hubei (CN); Jingning Liu, Hubei (CN); Wei Tong, Hubei (CN); Yu Hua, Hubei (CN); Shuangwu Zhang, Hubei (CN)

(73) Assignee: Hua Zhong University of Technology, Wuhan, Hubei (CN)

( * ) Notice: Subject to any disclaimer, the term of this patent is extended or adjusted under 35 U.S.C. 154(b) by 17 days.

(21) Appl. No.: 15/508,028

(22) PCT Filed: Sep. 9, 2014

(86) PCT No.: PCT/CN2014/086113
§ 371 (c)(1),
(2) Date: Mar. 1, 2017

(87) PCT Pub. No.: WO2016/037310
PCT Pub. Date: Mar. 17, 2016

(65) Prior Publication Data
US 2017/0293566 A1 Oct. 12, 2017

(51) Int. Cl.
G06F 12/00 (2006.01)
G06F 12/0888 (2016.01)
G06F 12/0864 (2016.01)

(52) U.S. Cl.
CPC ...... G06F 12/0888 (2013.01); G06F 12/0864 (2013.01); G06F 2212/1008 (2013.01); G06F 2212/2022 (2013.01); G06F 2212/60 (2013.01)

(58) Field of Classification Search
None
See application file for complete search history.

(56) References Cited

U.S. PATENT DOCUMENTS

| 6,539,456 | B2 | 3/2003 | Stewart |
| 7,328,307 | B2 * | 2/2008 | Hoogterp .............. G06F 3/0613 711/114 |

(Continued)

FOREIGN PATENT DOCUMENTS

| CN | 101782871 A | 7/2010 |
| CN | 102648457 A | 8/2012 |

OTHER PUBLICATIONS

"Ext4," Wikipedia, accessed at https://web.archive.org/web/20140924212629/http://en.wikipedia.org/wiki/Ext4, last modified on Sep. 2, 2014, pp. 5.

(Continued)

Primary Examiner — John A Lane (57) ABSTRACT

Technologies are generally described herein to detect non-volatile write request sequences. A write request is received to write to a solid-state device that includes the non-volatile memory. A determination is made as to whether the write request is part of a non-volatile write request sequence or is not part of the non-volatile write request sequence. In response to determining that the write request is part of the non-volatile write request sequence, the write request is associated with the non-volatile write request sequence. In response to determining that the write request is not part of the non-volatile write request sequence, the data associated with the write request is written to a cache that is coupled to the non-volatile memory. The data associated with the non-volatile write request sequences may be written directly to the non-volatile memory.

20 Claims, 6 Drawing Sheets

(56) References Cited

U.S. PATENT DOCUMENTS

| | | | |
|---|---|---|---|
| 7,966,456 B2 | 6/2011 | Trika et al. | |
| 8,255,614 B2 | 8/2012 | Omizo et al. | |
| 8,312,250 B2 | 11/2012 | Forhan et al. | |
| 8,407,403 B2 | 3/2013 | Prabhakaran et al. | |
| 8,788,742 B2* | 7/2014 | Benhase | G06F 12/123 711/103 |
| 2013/0173857 A1* | 7/2013 | Cheon | G06F 12/0246 711/103 |
| 2017/0083233 A1* | 3/2017 | Sun | G06F 3/061 |

OTHER PUBLICATIONS

"Understanding the Flash Translation Layer (FTL) Specification", Application Note, Intel Corporation, pp. 1-20 (Dec. 1998).

Chen, F., et al., "Hystor: Making the Best Use of Solid State Drives in High Performance Storage Systems," Proceedings of the international conference on Supercomputing, pp. 22-32 (May 31, 2011).

Hu, J., et al., "PUD-LRU: An Erase-Efficient Write Buffer Management Algorithm for Flash Memory SSD," 18th Annual IEEE/ACM International Symposium on Modeling, Analysis and Simulation of Computer and Telecommunication Systems, pp. 69-78 (Sep. 23, 2010).

International Search Report for International Application No. PCT/CN2014/086113, dated May 29, 2015, pp. 7.

Jiang, S., and Zhang, X., "LIRS: An efficient low inter-reference recency set replacement policy to improve buffer cache performance," Proceedings of the 2002 ACM Sigmetrics international conference on Measurement and modeling of computer systems, pp. 31-42 (Jun. 15, 2002).

Jin, X., et al., "Write-Aware Buffer Management Policy for Performance and Durability Enhancement in NAND Flash Memory," IEEE Transactions on Consumer Electronics, vol. 56, No. 4, pp. 2393-2399 (Nov. 2010).

Jo, H., et al., "FAB: Flash-aware buffer management policy for portable media players," IEEE Transactions on Consumer Electronics, vol. 52, No. 2, pp. 485-493 (May 2006).

Jung, H., et al., "LRU-WSR: integration of LRU and writes sequence reordering for flash memory," IEEE Transactions on Consumer Electronics, vol. 54, No. 3, pp. 1215-1223, (Aug. 2008).

Kim, H., and Ann, S., "BPLRU: A Buffer Management Scheme for Improving Random Writes in Flash," Proceedings of the 6th USENIX Conference on File and Storage Technologies, Article No. 16, pp. 239-252 (Feb. 26, 2008).

Matthews, J., "Intel® Turbo Memory: Nonvolatile disk caches in the storage hierarchy of mainstream computer systems," ACM Transactions on Storage (TOS), vol. 4, Issue 2 (May 11, 2008).

Park, S., et al., "CFLRU: A replacement algorithm for flash memory," Proceedings of the 2006 international conference on Compilers, architecture and synthesis for embedded systems, pp. 234-241 (Oct. 22, 2006).

Park, S., et al., "Using non-volatile ram as a write buffer for nand flash memory-based storage devices," IEEE International Symposium on Modeling, Analysis and Simulation of Computers and Telecommunication Systems, pp. 1-3 (Sep. 8, 2008).

Tang, X. and Meng, X., "ACR: An Adaptive Cost-Aware Buffer Replacement Algorithm for Flash Storage Devices," IEEE 14th International Conference on Mobile Data Management, pp. 33-42 (May 23, 2010).

Wei, Q., et al., "FlashCoop: A Locality-Aware Cooperative Buffer Management for SSD-based Storage Cluster," 39th International Conference on Parallel Processing (ICPP), pp. 20-22, Weeds Science Society of America, pp. 634-643 (Sep. 13, 2010).

* cited by examiner

FILTERING WRITE REQUEST SEQUENCES

CROSS-REFERENCE TO RELATED APPLICATION

The present application is a U.S. National Stage filing under 35 U.S.C. § 371 of International Application Serial No. PCT/CN2014/086113, filed on Sep. 9, 2014.

BACKGROUND

Unless otherwise indicated herein, the materials described in this section are not prior art to the claims of this application and are not admitted to be prior art by inclusion in this section.

Solid-state disks based on semi-conductor material may be gradually replacing traditional magnetic spinning disks in desktop computers and servers. In some cases, a solid-state disk may use a flash translation layer ("FTL") to emulate a block memory device that may be similar to a traditional magnetic hard disk, thus shielding the hardware characteristics of the non-volatile memory used by the solid-state disk. The FTL might be used by operating systems, database systems, and the like to interact with the solid-state disks or other devices.

One function the FTL might perform is cache management for a solid-state disk. For example, the FTL may be configured to cache hot data blocks in a cache of the solid-state disk using a cache management mechanism. Many different cache management mechanisms might be used by a solid-state disk. Generally, these different cache management mechanisms might increase a cache hit rate, reduce the latency of read/write response, and prolong the life of the non-volatile memory used by the solid-state disk. For example, a cache replacement mechanism may determine what data to maintain in a cache and what data to replace in a cache. Some example cache replacement mechanisms that may be used in solid-state disks might be based on the traditional least recently used ("LRU') cache replacement algorithm, on a variant of LRU, on low inter-reference recency sets ("LIRS'), on a variant of LIRS, or some other cache replacement mechanism. In some cases, however, these cache replacement mechanisms might not perform adequately. Attempting to improve the cache hit rate in order to increase the performance of solid-state disks can be challenging.

SUMMARY

In some examples, a method to detect non-volatile ("NV") write request sequences is described. The method includes receiving a write request that identifies data to write to a solid-state device that includes a cache and a non-volatile memory. A determination may be made as to whether the write request is part of a NV write request sequence that includes a plurality of write requests or is not part of the NV write request sequence. In response to determining that the write request is part of the NV write request sequence, the write request may be associated with the NV write request sequence. The data associated with the NV write request sequence may be written to the non-volatile memory. In response to determining that the write request is not part of the NV write request sequence, the data identified by the write request may be written to the cache.

In another example, a solid-state device is described. The solid-state device may include an interface, a cache, one or more non-volatile memories and a controller. The interface may be operative to receive write requests that may be provided to the controller. The controller may be configured to receive write requests from the interface and identify that one or more of the write requests are part of a NV write request sequence. The data associated with the write requests that are identified to be part of a NV write sequence may be written to the one or more non-volatile memories. The data associated with the write requests that are identified not to be part of a NV write sequence may be written to the cache.

In a further example, a computer-readable storage medium is described. The computer-readable storage medium comprises computer-executable instructions stored thereon which, in response to execution by a computer, cause the computer to determine that a write request to a non-volatile memory is part of a NV write request sequence. The determination that the write request is part of the NV write request sequence may include the determination of whether the write request is part of a sequence of write requests that specify contiguous memory locations. The determination may also include the determination of whether the write request is received within a specific time period from an adjacent write request that has an end address that is contiguous to a start address of the write request. The determination may also include the determination of whether data associated with the sequence of the write requests is larger than a size threshold. In response to the determination that the write request is part of the NV write request sequence, the data associated with the write request may be written to the non-volatile memory. In response to a determination that the write request is not part of the NV write request sequence, the data associated with the write request may be written to a cache that is coupled to the non-volatile memory.

The foregoing Summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented herein.

The aspects of the present disclosure, as generally described herein, and illustrated in the figures, can be arranged, substituted, combined, separated, and designed in a wide variety of different configurations, all of which are explicitly contemplated herein.

Further, one or more components of various figures described below may not be included in the figure for purposes of clarity. This should not be construed as a disclaimer or admission that the non-included components do not form part of the subject matter described herein. Additionally, one or more figures may use a "dashed" line as a border to visually encapsulate one or more components. Unless specifically described otherwise, the use of a dashed line is for purposes of illustration and does not reflect functional or physical boundaries.

This disclosure is generally drawn, inter alia, to technologies used to detect write request sequences for data that may be written directly to a non-volatile memory instead of first being written to a cache of a solid-state device. As used herein, the phrase "write request sequence" may include a series of related write requests that specify contiguous memory locations. For example, a write request sequence might include the individual write requests received by a solid-state device that relate to a single file or other related data.

At a file system level of a computing device, files may be typically written in contiguous memory spaces. For example, a write request to install software, to copy a movie or file, or to perform a similar operation, etc. may result in a write request for a large amount of data (e.g., the size of the file). At the level of a storage device, however, the write requests received by the device might be segmented requests that do not represent the entire file or data. For example, a file system may automatically parse and allocate a large file into multiple blocks, and segment a write request for a file or related data into multiple blocks (e.g., 8 KB) of smaller write requests.

In some examples, these smaller write requests may be received by a solid-state device in a contiguous manner. In other examples, these smaller write requests might be interleaved with other write requests. For example, in a multi-core multi-thread application environment, the write requests might be mixed with other request operations.

A solid-state device receiving a write request may be configured to determine whether the write request is part of a write request sequence. In some examples, all or a portion of write requests that are associated with a single file may be identified as being part of a non-volatile write request sequence. The data that is associated with the write requests identified to be part of the non-volatile write request sequence may be written directly to a non-volatile memory of a solid-state device. As used herein, the phrase "non-volatile write request sequence" or "NV write request sequence" may include a write request sequence that identifies data that is determined to be written to a non-volatile memory.

Write requests that are part of a NV write request sequence may be characterized by strong spatial locality (e.g., write requests generated for writing a single file). In other words, once a write request accesses a logic page, another write request may be soon to access the next address of the logic page. A write request sequence detector, as described herein, may use this spatial information to determine when to associate an incoming write request with a NV write request sequence that identifies data to be written to a non-volatile memory and when the write request identifies data that is to be processed by a cache replacement mechanism.

As briefly discussed above, a write request sequence may be comprised of different write requests. In some examples, a controller that is associated with a solid-state device may identify a time of arrival of a write request, a starting address of the write request, and a size of the write request. The controller may include a write request sequence detector configured to determine whether the received write request is contiguous with other received write requests. A write request may be contiguous with another write request when the write requests specify contiguous memory locations.

Stated in another way, the ending address of a previous write request may be contiguous to the starting address of a current write request.

The time interval between two adjacent write requests might be used when determining whether a write request is associated with other write requests and is part of a NV write request sequence. As another example, a size threshold might be specified that is used to determine if a write request is part of a NV write request sequence. The size threshold might be specified to be almost any value. For example, the size threshold might be specified to be at least 20K, 100K, 200K, 1 MB and the like. The size threshold might also be set based on a size of the cache of a solid-state device. For example, the size threshold for a larger cache may be larger as compared to the size threshold for a smaller cache.

In some examples, the data associated with write requests that are identified as being part of a NV write request sequence are not written to a cache that is associated with the solid-state device. Instead, the data associated with the write requests that are part of the NV write request sequence are written to the non-volatile memory of the solid-state device. Data associated with the write requests that are identified as not being part of a NV write request sequence may be written to the cache when determined. For example, the data identified by a write request may be written to a cache based on a determination of a cache replacement mechanism. More details regarding detecting NV write request sequences is provided below.

Figure 1:
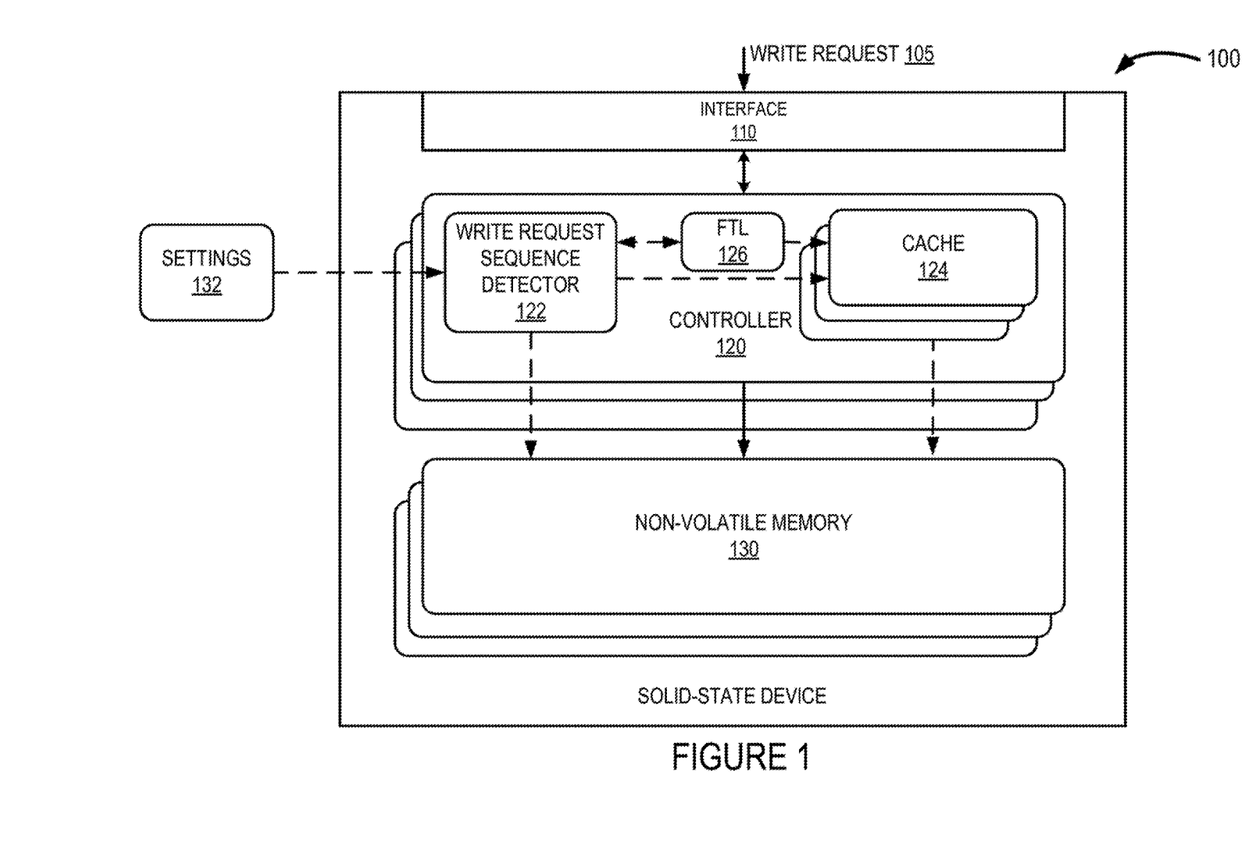
FIG. 1 is an illustration of an example of a solid-state device that may be configured to identify non-volatile write request sequences.

Referring now to FIG. 1, an example of a solid-state device 100 that may be configured to identify non-volatile write request sequences is shown that is arranged in accordance with at least some embodiments of the present disclosure. As illustrated, the solid-state device 100 may include an interface 110, a controller 120 and one or more non-volatile memories 130. The controller 120 is coupled to the interface 110 and the non-volatile memory 130. The controller 120 may comprise a write request sequence detector 122, one or more caches 124 and a flash transition layer ("FTL") 126 that are coupled to each other.

As illustrated, the interface 110 may be operative to receive write requests, such as a write request 105. In some examples, the cache 124 may be separate from the controller 120, such as being located externally to the controller 120. The solid-state device 100, or various components of the solid-state device 100, may be separate from or part of one or more components of a computing device. The various components of the solid-state device 100 in FIG. 1 are illustrated as a unitary device for descriptive purposes only. The solid-state device 100 may include fewer or more components as illustrated.

Figure 2:
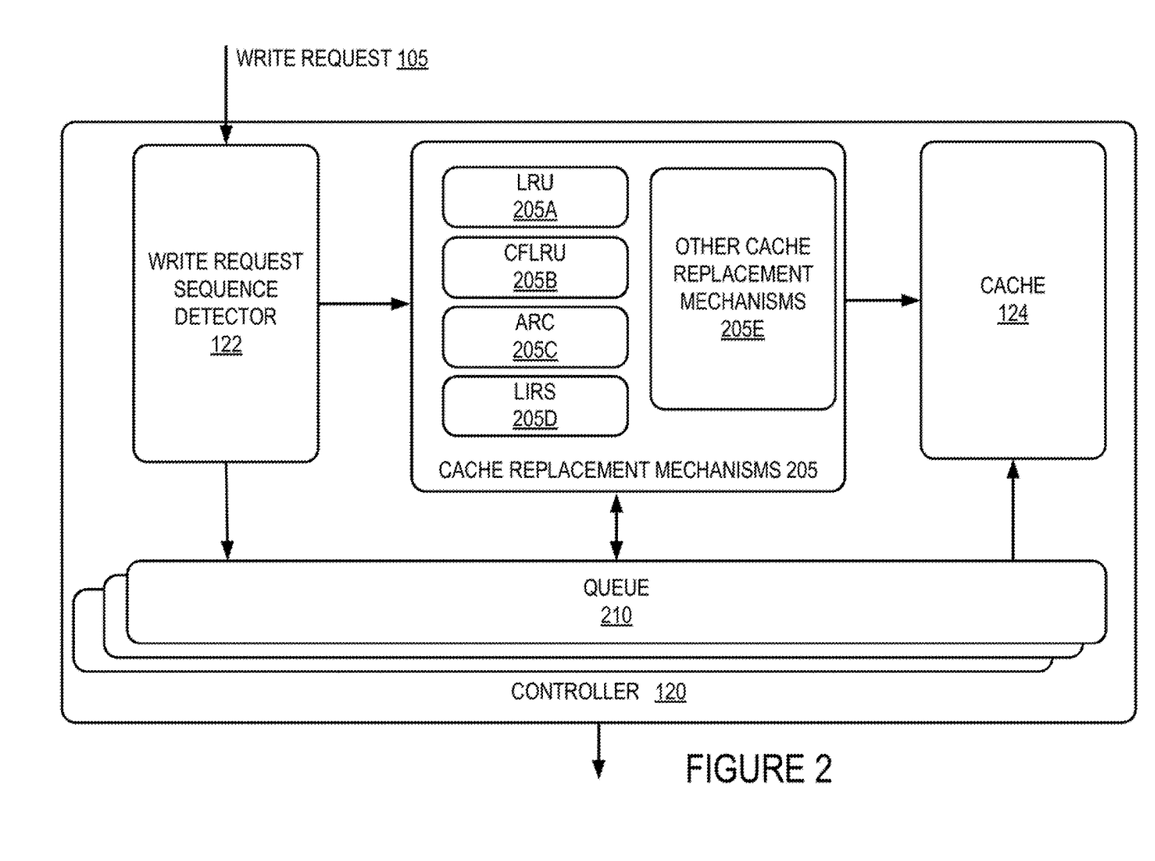
FIG. 2 illustrates an example of a controller that may include a write request sequence detector and a cache replacement mechanism that might be used in a solid-state device.
Figure 6:
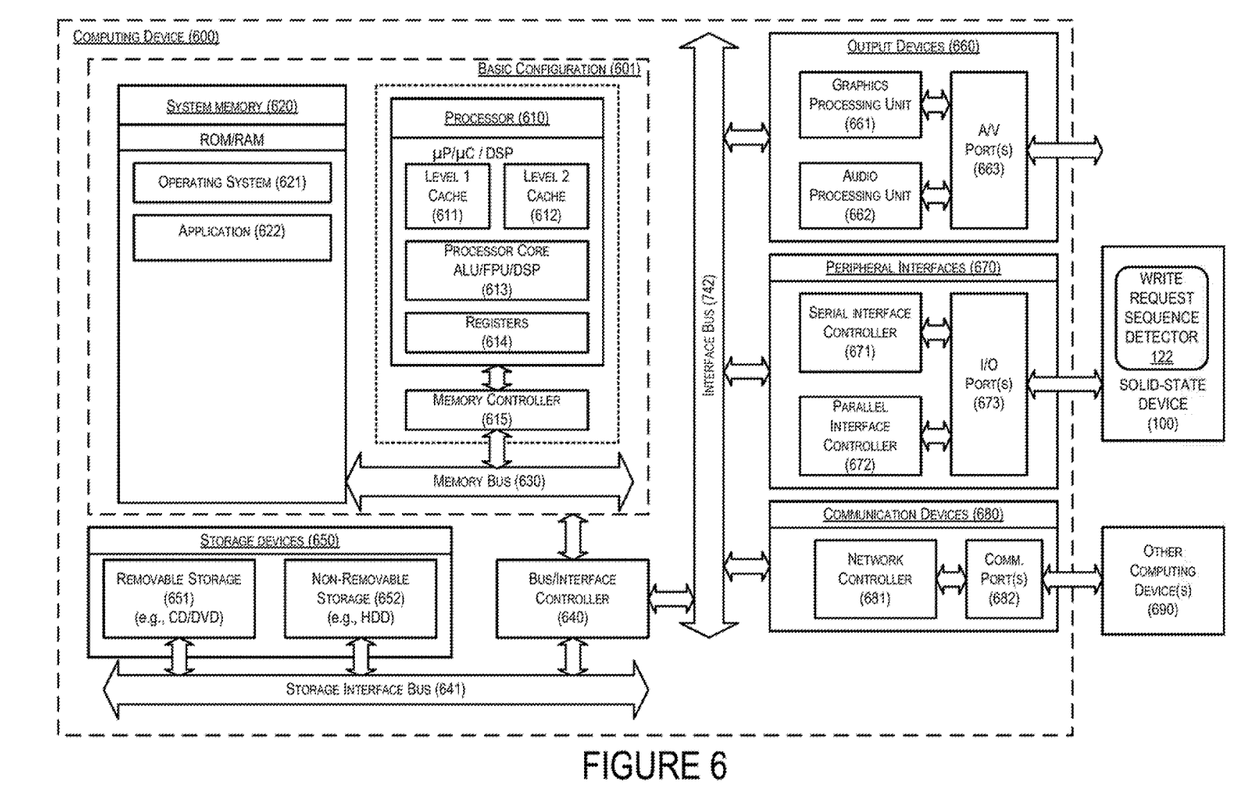
FIG. 6 is a block diagram illustrating an example computing device that may be used in conjunction with a solid-state device, all arranged according to at least some embodiments presented herein.

For example, one or more processors, such as the processors 610 shown in computing device 600 might be included in the solid-state device 100. Further, the FTL 126 may be configured to include the write request sequence detector 122 and/or other components (e.g., one or more cache replacement mechanisms 205 as shown in FIG. 2).

The non-volatile memory 130 may include one or more non-volatile memories and/or one or more types of non-volatile memory. In some examples, the larger the number of non-volatile memories 130, the better the performance of the solid-state device 100.

For example, when multiple non-volatile memories 130 operate in parallel, the bandwidth may scale and latencies that might be associated with non-volatile memories 130 might be lowered.

Many different types of non-volatile memory may be used. In an example, NAND flash memory may be used. In another example, NOR flash memory might be used. In yet other examples, dynamic random access memory ("DRAM") (e.g., double data rate synchronous dynamic random-access memory ("DDR SDRAM"), static random-access memory ("SRAM') or magneto resistive random-access memory ("MRAM") might be used. Generally, any type of non-volatile memory might be used as the non-volatile memory 130 in the solid-state device 100.

As discussed above, a file system (not shown) may parse and allocate a file into multiple logic blocks, and segment a single write request (e.g., related to a single file) into multiple write requests of a specified size (e.g., 8 KB). Segmenting a write request into multiple write requests may generate a write request sequence that includes a series of write requests that may be received by the solid-state device 100 using the interface 110. For example, the interface 110 might receive a write request 105 that may or may not be part of a write request sequence. The interface 110 might include any interface that is configured to receive a write request 105 for the solid-state device 100. For example, the interface 110 might include a serial ATA ("SATA") interface, a peripheral component interconnect express ("PCI-E") interface, a serial attached SCSI ("SAS") interface, an external SATA ("eSATA") interface, and the like.

As illustrated, the one or more controllers 120 may include the write request sequence detector 122, the FTL 126 and one or more caches 124. In some examples, the controller 120 may be configured to bridge the one or more non-volatile memories 130 to a host computer (e.g., the computing device shown in FIG. 6 or some other device). The controller 120 may be implemented as an embedded processor that is contained within the solid-state device 100 or in some other manner. The controller 120 might also include more or less components as illustrated. In some examples, the components of the controller 120 may be operative to perform error-correcting, wear-levelling, bad block mapping, memory scrubbing, read and write caching, garbage collection and encryption, as well as other operations.

As discussed above, the FTL 126 may be used to emulate a block memory device that is similar to a traditional magnetic hard disk, thus shielding the hardware characteristics of the non-volatile memory 130 used by the solid-state device 100. For example, the FTL 126 may be configured to cache hot data blocks in the cache 124 of the solid-state device 100 using a cache replacement mechanism 205 as described in more detail with reference to FIG. 2.

The cache 124 may be operative to store data related to the solid-state device 100. As briefly discussed above, the use of a cache 124 may improve the efficiency of read and write operations as well as to prolong the life of the non-volatile memory 130 of the solid-state device 100. In some examples, the cache 124 may be configured to store data that is not associated with a NV write request sequence.

The cache 124 may be a small, fast memory that may be used to store frequently used, recently used, or soon to be used, blocks of data for rapid access. The cache 124 may mitigate some of the latency associated with accessing the non-volatile memory 130.

In many examples, the size of the cache 124 may be smaller as compared to the size of the non-volatile memory 130. As discussed in more detail below, different cache replacement mechanisms may be used by the controller 120 to determine when to replace data within the cache 124 when one or more write requests are determined not to be associated with a NV write request sequence.

The write request sequence detector 122 that is illustrated in the controller 120 may be configured to detect write request sequences and NV write request sequences. The write request sequence detector 122 may also be configured to write the data identified by the NV write request sequences to the non-volatile memory 130. In some examples, the write request sequence detector 122 detects NV write request sequences, writes the data associated with the write requests that are part of the NV write request sequence to the non-volatile memory 130 without first writing the data to the cache 124. The write request sequence detector 122 might be utilized to assist in preventing data that is not likely to change from filling up the memory of the cache 124. In different examples, not writing data that is associated with NV write request sequences to the cache 124 may improve the performance of a solid-state device, such as the solid-state device 100.

A configuration option (not shown) might be used to specify settings 132 that define a NV write request sequence. For example, the settings 132 might be specified using a text file, through a graphical user interface, or using some other mechanism. The settings 132 that are specified may relate to a size threshold for a write request sequence and/or a time interval for receiving write requests that are part of the same write request sequence. For example, the settings 132 may specify that the time interval between write requests for a write request sequence is one second, two seconds, or some other time. The size threshold may be specified as a number of blocks (e.g., two, three, four and five), a total size (e.g., 30K, 80K) of the write request sequence, and the like. The write request sequence detector 122 might use these settings 132 when detecting NV write request sequences.

In response to detecting a NV write request sequence, the write request sequence detector 122 may write the data associated with the NV write request sequence to the non-volatile memory 130. When a write request, such as the write request 105, is not part of an NV write request sequence, the data associated with the write request 105 may be written to the cache 124 of the solid-state device using a cache management mechanism as described in more detail below. In some examples, once a NV write request sequence is detected by the write request sequence detector 122, the data associated with the NV write request sequence is written directly to non-volatile memory 130 by the controller 120 without first being written to the cache 124. More details regarding detecting a NV write request sequence are provided below.

FIG. 2 illustrates an example of a controller, such as the controller 120 of FIG. 1, that may include a write request sequence detector 122 and a cache replacement mechanism 205 that might be used in the solid-state device 100 that is arranged in accordance with at least some embodiments of the present disclosure. The controller 120 may comprise the write request sequence detector 122, one or more cache replacement mechanisms 205, the cache 124, and one or more queues 210. The write request sequence detector 122 may be configured to receive write requests, such as write request 105, and may be coupled to the cache replacement mechanisms 205 and the queue(s) 210. The cache replacement mechanisms 205 may be coupled to the write request sequence detector 122, the cache 124 and the queue(s) 210. The queue(s) 210 may be coupled to the cache 124, the write request sequence detector 122, and the cache replacement mechanisms 205.

As illustrated, the cache replacement mechanisms 205 may include one or more cache replacement mechanisms. Example cache replacement mechanisms may include, but are not limited to, a LRU 205A cache replacement mechanism, a clean-first LRU ("CFLRU") 205B cache replacement mechanism, an adaptive replacement cache ("ARC") 205C cache replacement mechanism, a LIRS 205D cache replacement mechanism and other cache replacement mechanisms 205E.

As discussed above, there may be many cache replacement mechanisms that might be used in the management of non-volatile (e.g., flash) memory 130. In some examples, one or more cache replacement mechanisms 205 may be used by the write request sequence detector 122 to determine what data (that is not associated with a NV write request sequence in some examples) to write to the cache 124. One cache replacement mechanism 205 that might be used by the write request sequence detector 122 may be the Least Recently Used ("LRU") 205A cache replacement mechanism. Generally, when using a cache replacement mechanism 205 that is based on LRU, the data that is least used in the cache 124 may be replaced before other data that has been used more recently.

Another cache replacement mechanism that might be used by the controller 120 may be the CFLRU 205B cache replacement mechanism. The CFLRU 205B may be a cache replacement mechanism that is configured to preferentially replace read-only pages, making use of the asymmetry between write and read performance of flash memory.

The CFLRU 205B cache replacement mechanism may presume that the write cost of flash memory is much higher than its read cost. One basis of CFLRU 205B is to divide an LRU chain table into a working Region and clean-first Region. Whenever a missing page interrupt occurs, if there are read-only data pages in the clean-first region, the CFLRU 205B may be configured to select the read-only pages that are least used recently for replacement. If there is not a read-only data page in the Clean-First Region, the CFLRU 205B may be configured to choose the modified pages at the end of a chain table for replacement.

Another cache replacement mechanism 205 that might be used by the controller 120 may be the Adaptive Replacement Cache (ARC) 205C cache replacement mechanism.

The ARC 205C may use a cost-based heuristic mechanism to select replacement pages, to help enable fair choosing between unmodified data pages and modified data pages.

Yet another cache replacement mechanism that might be used may be the LIRS 205D cache replacement mechanism. Generally, the LIRS 205D cache replacement mechanism may be configured to maintain two queues that are used in an attempt to save one-access data and multi-access data.

Besides the cache replacement mechanisms 205 described above, there may be also other cache replacement mechanisms 205E that might be used by the controller 120 or the write request sequence detector 122 to manage writing data to the cache 124. Some of these cache replacement mechanisms may include, but are not limited to, Least Recently Used-Write Sequence Reordering ("LRU-WSR"), Block Padding Least Recently Used ("BPLRU"), and/or others. Generally, the cache replacement mechanisms 205 may be configured to retain frequently modified hot data blocks in the cache 124 according to the device characteristics, and swap out data blocks that are accessed infrequently.

A device, such as the solid-state device 100 might be configured to use one or more cache replacement mechanisms 205 in conjunction with the write request sequence detector 122. As discussed herein, in some examples, the cache replacement mechanisms 205 may be used to determine the data that is not associated with a NV write request sequence to write to the cache 124.

As discussed above, when a write request 105 is received at the controller 120, the write request sequence detector 122 may be configured to determine whether the write request 105 is part of a NV write request sequence. In some examples, information that is associated with a received write request 105 (e.g., data and/or write request information) may be temporarily stored in the queue(s) 210 by the write request sequence detector 122. For example, the information that is stored in the queue(s) 210 may include a time the write request 105 is received, a starting address of the write request 105, and a size of the write request 105. The queue(s) 210 may also be configured to store the data that is identified to be written by received write requests, such as the write request 105.

The queue(s) 210 may be configured in a variety of different manners. Generally, the queue(s) 210 may include a memory (e.g., a buffer) that is configured to temporarily store data until the data is stored in the non-volatile memory 130 or in the cache 124.

Figure 3:
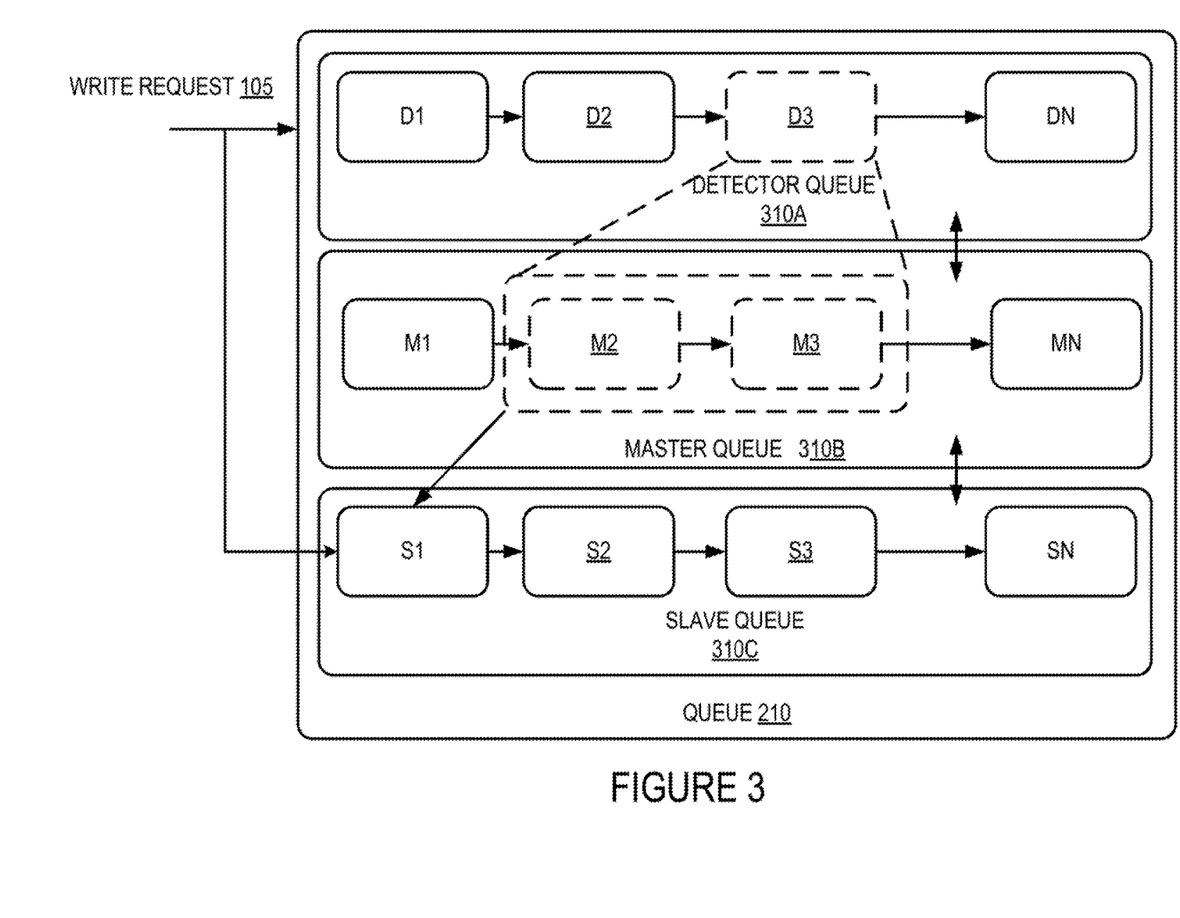
FIG. 3 shows an example of a queue structure that may be used to temporarily store write requests and information relating to write requests.

In some examples, the queue(s) 210 may be part of the cache 124 and/or some other memory (not shown). FIG. 3 provides more details on the queue(s) 210, in accordance with at least some embodiments.

As discussed above, the size of the data that is associated with a write request sequence may be determined by the write request sequence detector 122. When the size of the data of a write request sequence is larger than a specified size, the write request sequence may be identified by the write request sequence detector 122 as a NV write request sequence. In response to the write request sequence being identified as the NV write request sequence, the data associated with the NV write request sequence may be written to the non-volatile memory 130 by the write request sequence detector 122 without first being written to the cache 124 or being subject to the cache replacement mechanisms 205. For example, data from the queue(s) 210 that is associated with the NV write request sequence may be written to the non-volatile memory 130 by the write request sequence detector 122 without first being written to the cache 124.

If a write request sequence is determined to not be part of a NV write request sequence by the write request sequence detector 122, one or more of the cache replacement mechanisms 205 (or some other mechanism) might be used to determine what data to write to the cache 124. For example, one or more cache replacement mechanisms 205 may be used by the controller 120 or the write request sequence detector 122 to determine whether to write data to the cache 124 and whether to write data that is associated with the write requests to the non-volatile memory 130. For example, a cache replacement mechanism, such as LIRS 205D, may be used by the write request sequence detector 122 to determine what data to replace in a cache 124. In some examples, the data that is determined to not be a part of a NV write request sequence may be obtained from the queue(s) 210 and/or directly from a received write request, such as the write request 105.

FIG. 3 shows an example of a queue structure that may be used to temporarily store write requests and information relating to write requests that is arranged in accordance with at least some embodiments of the present disclosure. As illustrated, the queue(s) 210 may include a detector queue 310A, a master queue 310B, and a slave queue 310C.

The detector queue 310A may be coupled to the master queue 310B. The master queue 310B may be coupled to the slave queue 310C. In some examples, the detector queue 310A, the master queue 310B and the slave queue 310C may be configured to communicate with each other.

The detector queue 310A may be configured to store write request information for received write requests, such as the write request 105. For example, the detector queue 310A may store all or a portion of the following, but not limited to the time that the write request 105 is received, a starting address of the write request 105, an ending address of the write request 105 and a size of write request 105. In other examples, the write request information that is associated with received write requests and write request sequences may be stored in another memory location (e.g., master queue 310B, slave queue 310C, or some other memory).

The master queue 310B may be configured to temporarily store data that is associated with a write request until a determination is made as to write the data to the cache 124 or to the non-volatile memory 130. For example, the master queue 310B might include the data indicated by the write request 105 to be written to the solid-state device 100.

The slave queue 310C may be configured to store the data that is associated with write requests, including the data associated with the NV write request sequences that are swapped out of the master queue 310B when the data is ready to write to the non-volatile memory 130. As discussed above, a write request sequence may be determined to be a NV write request sequence. The write request sequence detector 122 may identify the data that is associated with the NV write request sequence ready to write to the non-volatile memory 130 when the data associated with a write request sequence is larger than a specified size and/or the write requests of the write request sequence are obtained within a specified period of time.

The write request sequence detector 122 may be configured to receive a write request, such as the write request 105, and examine the detector queue 310A to determine if the write request 105 is part of an existing write request sequence. The write request sequence detector 122 may also be configured to determine if a new write request sequence node is to be added into the detector queue 310A or determine if a node in detector queue 310A is to be removed. In some examples, a node in the detector queue 310A may represent one or more write requests that may become a NV write request sequence. For example, node D3 may include a write request sequence that has not yet been identified as a NV write request sequence (and may never be identified as a NV write request sequence) by the write request sequence detector 122.

The write request sequence detector 122 may be configured to delete any of the nodes in the detector queue 310A that overlap the spatial address of a currently received write request 105. For example, the write request sequence detector 122 may detect that the starting address and the ending address for the write request 105 overlaps addresses in a node. In some examples, if a node overlaps the spatial address of the currently received write request 105, the node is no longer a candidate as a potential NV write request sequence.

The write request sequence detector 122 may also be configured to determine a time gap between when the last write request is received that is associated with the node (e.g., the last contiguous write request received for the node) and when the current write request 105 is received. According to an embodiment, when the time gap exceeds a specified threshold as discussed above, the write request 105 may be determined by the write request sequence detector 122 to not be part of a NV write request sequence. The write request sequence detector 122 may then remove the node that is associated with the write request 105. The write request sequence detector 122 may also remove any related write requests from the detector queue 310A.

Generally, if a node in the detector queue 310A is deleted, the data associated with the request 105 may fall within the address range covered by the deleted node. As such, the data contained in the deleted node may have been accessed again and the data contained in the deleted node may not be associated with contiguous write requests and may, therefore, not be part of a NV write request sequence.

The write request sequence detector 122 may be configured to detect when the write request 105 may be part of a NV write request sequence. For example, the write request sequence detector 122 may detect a possible NV write request sequence when the write request 105 is contiguous to other write requests that are associated with a node (e.g., node D3 in this example) and is received within the specified time gap. In response to detecting a possible NV write request sequence, the write request sequence detector 122 may place the information for the write request 105 in the detector queue 310A.

The information may also be combined or accumulated with any contiguous write requests that are stored within the detector queue 310A. The write request sequence detector 122 may also place the write request 105 in the master queue 310B. In another example, the write request sequence detector 122 may determine if the node in the detector queue 310A (e.g., node D3 in this example) satisfies the specified conditions of a NV write request sequence.

In some examples, the write request sequence detector 122 may determine whether the new node in the detector queue 310A is a NV write request sequence. As illustrated, each node in the detector queue 310A may represent a write request or a write request sequence that might become a NV write request sequence. For example, as discussed above, a write request sequence may be determined to be a NV write request sequence based on specified settings that define a NV write request sequence (e.g., a specified size and write requests received within a specified period of time).

An example will now be provided for illustrative purposes. When a request, such as write request 105 arrives, the write request sequence detector 122 may examine the detector queue 310A and may determine whether the request 105 is contiguous to any of the requests stored in the nodes. In the current example, the write request sequence detector 122 may determine that the write request 105 is associated with node D3 (e.g., the write request 105 may be contiguous to another write request contained within node D3).

When the write request sequence detector 122 determines that the write request 105 is contiguous, the write request 105 may be stored into node D3. The size of node D3 may be examined by the write request sequence detector 122, and if the size is larger than the specified write request sequence size, the node may be identified as a NV write request sequence by the write request sequence detector 122.

In response to detecting that write requests that are associated with a node (e.g., node D3) are part of a NV write request sequence, the data that is associated with the current write request 105 may be written to the non-volatile memory 130. For example, the write request 105 may be placed at the head of the slave queue 310C (e.g., node S1).

The data that is associated with the other write requests (e.g., node M2 and node M3 stored in the master queue 310B) that are part of the NV write request sequence may also be moved to the head of the slave queue 310C for writing to the non-volatile memory 130.

When a write request is determined to be not a part of a write request sequence by the write request sequence detector 122, or that a node in the detector queue 310A is not determined to be part of a NV write request sequence, the data at the end of master queue 310B may be replaced. For example, the data may be replaced according to a selected cache replacement mechanism 205 used by the controller 120 when determining what data to write to the cache 124.

Figure 4:
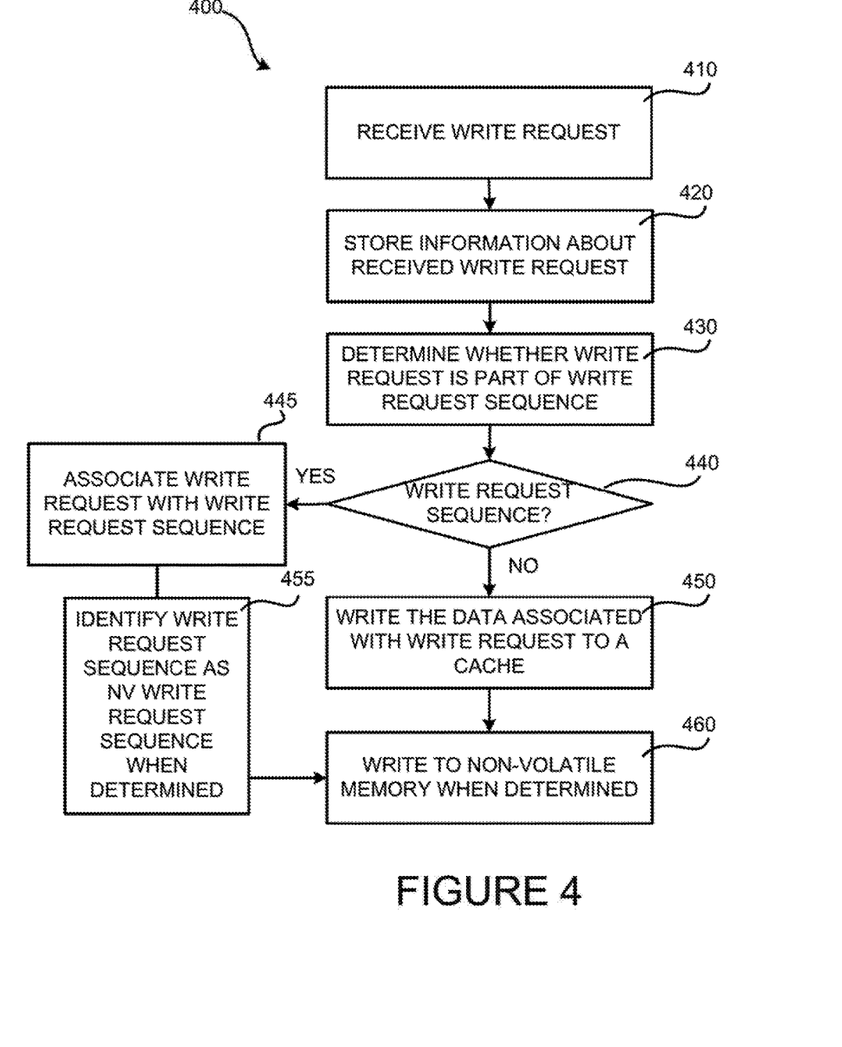
FIG. 4 is a flow diagram illustrating an example method to filter write request sequences.
Figure 5:
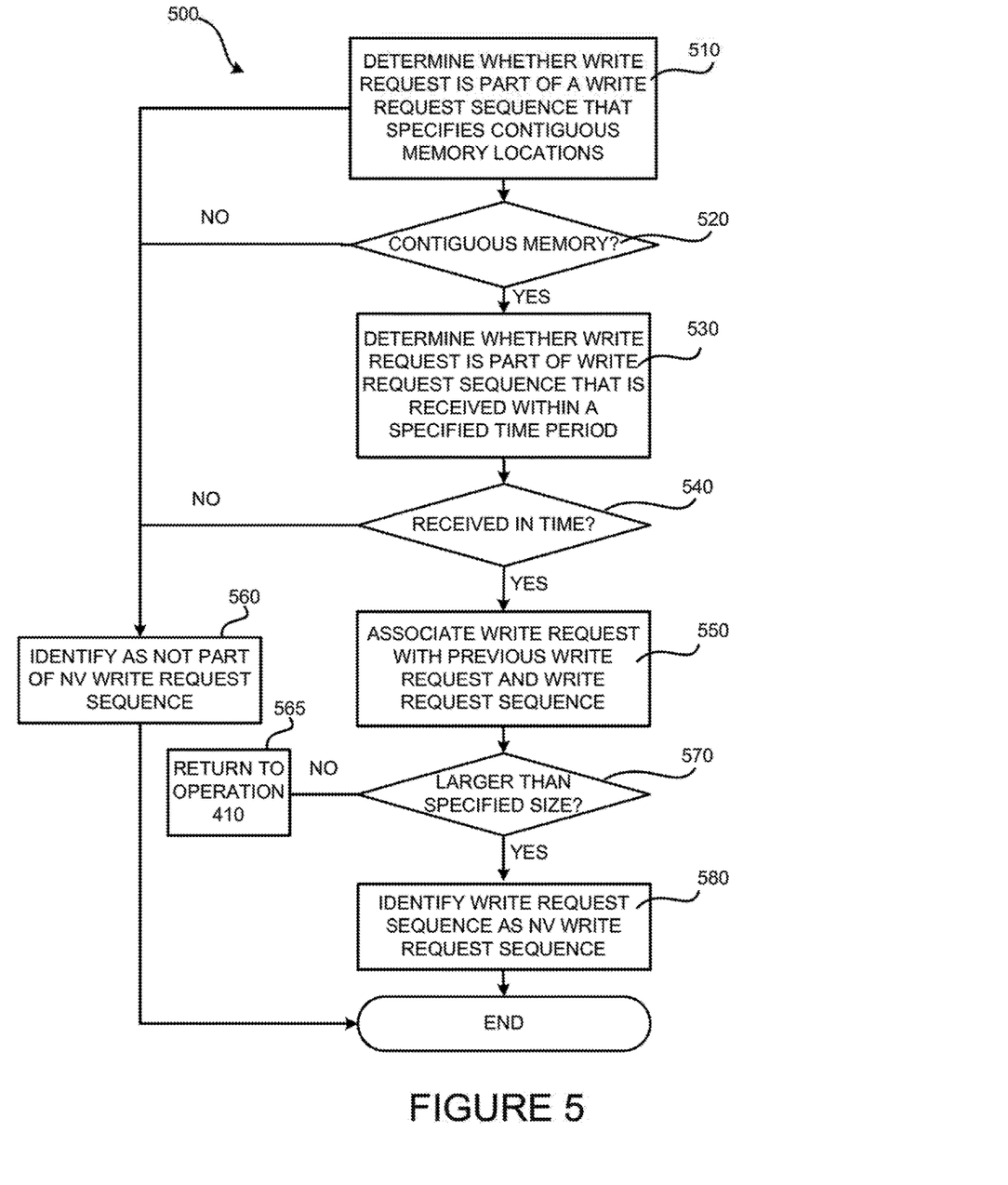
FIG. 5 is a flow diagram of an example method to determine whether a write request is part of a write request sequence and whether a write request sequence is a NV write request sequence.

FIGS. 4-5 are flow diagrams illustrating example processes to filter write request sequences to detect NV write request sequences, in accordance with at least some embodiments described herein. The operations of any process described herein are not necessarily presented in any particular order and that performance of some or all of the operations in an alternative order(s) is possible and is contemplated. The operations have been presented in the demonstrated order for ease of description and illustration.

Operations may be added, combined, modified, omitted, and/or performed simultaneously, in a different order, etc., without departing from the scope of the present disclosure.

The illustrated processes can be ended at any time and need not be performed in its entirety. Some or all operations of the processes, and/or substantially equivalent operations, can be performed in one embodiment by execution of computer-readable instructions included/stored on a computer storage media, such as those described herein, including a tangible non-transitory computer-readable storage medium. The term "computer-readable instructions," and variants thereof, as used in the description and claims, is used expansively herein to include routines, applications, application modules, program modules, programs, components, data structures, algorithms, or the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, or the like. For purposes of illustrating and describing the concepts of the present disclosure, the processes 400 and 500 are described as being performed, at least in part, by a computing device, such as solid-state device 100. This embodiment is illustrative, and the processes may be performed in other ways.

Turning now to FIG. 4, additional details are provided regarding the embodiments presented herein to filter write request sequences, in accordance with at least some embodiments described herein. The process 400 may begin at block 410 ("receive write request"), where a write request 105 may be received. As discussed above, the write request 105 might be received by an interface 110 and passed to a controller, such as the controller 120 for processing as described herein.

The process 400 may continue to block 420 ("store information about received write request"), where information about the received write request 105 might be stored. As discussed above, the information might include, but is not limited to a time the write request 105 is received, a size of the write request 105, a start address of the write request 105 and an end address of the write request 105. This information may be stored by the write request sequence detector 122 in the queue 210, such as in the detector queue 310A, or some other memory.

The process 400 might continue to block 430 ("determine whether write request is part of a write request sequence"), where a determination may be made as to whether the write request 105 is part of a write request sequence. As discussed above, a write request 105 might be considered by the write request sequence detector 122 to be part of a write request sequence when the write request is part of a sequence of write requests that specify contiguous memory locations. FIG. 5 provides more details regarding determining whether a write request 105 is part of a write request sequence and whether the write request sequence is a NV write request sequence.

The process 400 might continue to decision block 440 ("write request sequence?"), where a decision may be made as to whether the write request 105 is part of a write request sequence. In response to determining that the write request 105 is part of a write request sequence, the process might move to block 445. In response to determining that the write request is not part of a write request sequence, the process might move to block 450.

At block 445 ("associate write request with write request sequence"), the write request may be associated with a write request sequence. As discussed above, the write request 105 that is associated with a write sequence might be temporarily stored by the controller 120 in a memory along with the other write requests in the write request sequence. For example, the write request 105 may be stored in the queue 210 before determining that the possible NV write request sequence is a NV write request sequence or is not a NV write request sequence.

From block 445, the process 400 may continue to block 455 ("identify write request sequence as NV write request sequence when determined") where the write request sequence may be identified as a NV write request sequence when determined. As discussed above, the write request sequence detector 122 may determine whether a write request sequence meets the specified conditions of a NV write request sequence (e.g., data larger than a specified size, write requests received within a specified period of time).

At block 450 ("write the data associated with the write request to a cache"), the data associated with the write request 105 that is not determined to be part of a write request sequence or a NV write request sequence may be written to a cache, such as the cache 124. As discussed above, the data associated with the write request 105 might be written to a cache 124 of a solid-state device 100. In some examples, a cache replacement mechanism, such as one or more of the cache replacement mechanisms 205, may be used to determine what data to write to the cache 124 and what data to write to the non-volatile memory 130.

The process 400 may continue to block 460 ("write to non-volatile memory when determined"), where a write to the non-volatile memory 130 may be performed when determined. As discussed above, NV write request sequences may be written to the non-volatile memory by the controller 120 without first writing data associated with the write requests comprising the NV write request sequence to a cache, such as the cache 124.

FIG. 5 is a flow diagram of an example method to determine whether a write request is part of a write request sequence and whether a write request sequence is a NV write request sequence in accordance with at least some embodiments described herein. The process 500 may begin at block 510 ("determine whether write request is part of a write request sequence that specifies contiguous memory locations"), where a determination may be made as to whether the write request 105 is part of a sequence of write requests that specify contiguous memory locations. As discussed above, the write request 105 might be considered to be part of a write request sequence by the write request sequence detector 122 when the write request 105 specifies a starting address that is contiguous to the ending address specified by a previously received write request 105.

The process 500 may continue to decision block 520 ("contiguous memory?"), where a decision may be made by the write request sequence detector 122 as to whether the write request 105 specifies a contiguous memory location from a previously received write request 105. In response to determining that the write request 105 specifies a contiguous memory location, the process might move to block 530. In response to determining that the write request 105 does not specify a contiguous memory location, the process might move to block 560 where the write request 105 is identified as not part of a NV write request sequence.

At block 530 ("determine whether write request is part of a write request sequence that is received within a specified time period"), where a determination may be made by the write request sequence detector 122 as to whether the write request 105 is received within a specified period of time. As discussed above, a write request 105 might be associated by the write request sequence detector 122 with a write sequence when the write request 105 is received within a specified period of time (e.g., <1 second) after receiving one or more other write requests that are part the write request sequence.

The process 500 may continue to decision block 540 ("received in time?"), where a decision may be made by the write request sequence detector 122 as to whether the write request 105 is received within the specified time period. In response to determining that the write request 105 is received within the specified time period, the process 500 might move to block 550. In response to determining that the write request is not received within the specified time period, the process 500 might move to block 560 where the write request 105 is identified as not part of a NV write request sequence.

At block 550 ("associate write request with previous write request and write request sequence"), where the write request 105 may be associated with a previous write request and the write request sequence. As discussed above, a time period may be used by the write request sequence detector 122 in determining whether the write request sequence is a NV write request sequence. In some examples, the write request and/or the write request sequence may temporarily be stored in a memory, such as the queue(s) 210.

The process 500 may continue to decision block 570 ("larger than a specified size?"), where a decision may be made by the write request sequence detector 122 as to whether the data that is associated with the write request sequence is larger than a specified size.

As discussed above, a write request sequence may be considered to be a NV write request sequence when the data that is associated with the write request sequence is larger than the specified size (e.g., 8 KB, 16 KB . . . ). In response to determining that the data that is associated with the write request sequence is larger within the specified size, the process 500 might move to block 580. In response to determining that the data that is associated with the write request sequence is not larger than the specified size, the process 500 might move to block 565 and may return to block 410 as illustrated in FIG. 4.

At block 580 ("identify write request sequence as NV write request sequence"), where the write request sequence may be identified by the write request sequence detector 122 as a NV write request sequence. As discussed above, different mechanisms and conditions might be used in determining whether a write request sequence is a NV write request sequence. The process 500 may thereafter end.

FIG. 6 is a block diagram illustrating an example computing device 600 that may be used in conjunction with a solid-state device 100 in accordance with at least some embodiments described herein. In a very basic configuration 601, computing device 600 typically includes one or more processors 610 and system memory 620. A memory bus 630 can be used for communicating between the processor 610 and the system memory 620. The solid-state device 100 as illustrated includes a write request sequence detector 122 and may be configured as described herein. The solid-state device 100 may also include some or all of the components illustrated in the computing device 600, and in some implementations, the solid-state device 100 may be embodied at least in part by the various components of the computing device 600 described herein.

Depending on the desired configuration, processor 610 can be of any type including, but not limited to, a microprocessor ("P"), a microcontroller ("μC"), a digital signal processor ("DSP"), or any combination thereof. Processor 610 can include one more levels of caching, such as a level one cache 611 and a level two cache 612, a processor core 613, and registers 614. The processor core 613 can include an arithmetic logic unit ("ALU"), a floating point unit ("FPU"), a digital signal processing core ("DSP Core"), or any combination thereof. A memory controller 615 can also be used with the processor 610, or in some implementations the memory controller 615 can be an internal part of the processor 610. The processor 610 can be a multi-core processor having two or more independent processing units ("cores"). In some embodiments, the memory controller 615 can be used to implement the controller 120; one or more of the caches 611 and 612 (or other cache) can be used to implement the cache 124; and the system memory 620 (or other storage device) can be used to implement the non-volatile memory 130.

Depending on the desired configuration, the system memory 620 can be of any type including, but not limited to, volatile memory (such as RAM), non-volatile memory (such as ROM, flash memory, etc.) or any combination thereof. One or more components of the system memory 620 may be comprised of multilevel cells formed from germanium-antimony-tellurium ("GST") material, providing a phase change memory.

Computing device 600 can have additional features or functionality, and additional interfaces to facilitate communications between the basic configuration 601 and any required devices and interfaces. For example, a bus/interface controller 640 can be used to facilitate communications between the basic configuration 601 and one or more data storage devices 650 via a storage interface bus 641. The data storage devices 650 can be removable storage devices 651, non-removable storage devices 652, or a combination thereof. Examples of removable storage and non-removable storage devices include magnetic disk devices such as flexible disk drives and hard-disk drives ("HDD"s), optical disk drives such as compact disk ("CD") drives or digital versatile disk ("DVD") drives, solid state drives ("SSDs"), and tape drives to name a few.

Examples of computer storage media can include volatile and nonvolatile, removable and non-removable media implemented in any method or technology for storage of information, such as computer readable instructions, data structures, program modules, or other data.

System memory 620, removable storage devices 651 and non-removable storage devices 652 are all examples of computer storage media. Computer storage media includes, but is not limited to, RAM, ROM, EEPROM, flash memory or other memory technology, CD-ROM, digital versatile disks ("DVD"s) or other optical storage, magnetic cassettes, magnetic tape, magnetic disk storage or other magnetic storage devices, or any other medium which can be used to store the desired information and which can be accessed by computing device 600. Any such computer storage media can be part of the computing device 600.

Computing device 600 can also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which can be configured to communicate to various external devices such as a display or speakers via one or more A/V ports 663.

Example peripheral interfaces 670 include a serial interface controller 671 or a parallel interface controller 672, which can be configured to communicate with external devices such as input devices (e.g., keyboard, mouse, pen, voice input device, touch input device, etc.) or other peripheral devices (e.g., printer, scanner, etc.) via one or more I/O ports 673. In some examples, the I/O ports 673 is coupled to a solid-state device 100 as described herein. An example communication device 680 includes a network controller 681, which can be arranged to facilitate communications with one or more other computing devices 690 over a network communication via one or more communication ports 682. The communication connection is one example of a communication media.

Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal.

By way of example, communication media can include wired media such as a wired network or direct-wired connection, and wireless media such as acoustic, radio frequency ("RF"), infrared ("IR"), Fiber Optics ("FO"), and other wireless media. The term computer readable media as used herein can include both storage media and communication media.

Computing device 600 can be implemented as a portion of a small-form factor portable (or "mobile") electronic device such as a solid-state device 100, a cell phone, a personal data assistant ("PDA"), a personal media player device, a wireless web-watch device, a personal headset device, an application specific device, or a hybrid device that include any of the above functions. Computing device 600 can also be implemented as a personal computer including both laptop computer and non-laptop computer configurations.

The present disclosure is not to be limited in terms of the particular embodiments described in this application, which are intended as illustrations of various aspects.

Many modifications and variations can be made without departing from its spirit and scope. Functionally equivalent methods and apparatuses within the scope of the disclosure, in addition to those enumerated herein, are possible. Such modifications and variations are intended to fall within the scope of the appended claims. The present disclosure is to be limited only by the terms of the appended claims, along with the full scope of equivalents to which such claims are entitled. This disclosure is not limited to particular methods, compounds, or compositions, which can, of course, vary. The terminology used herein is for the purpose of describing particular embodiments only, and is not intended to be limiting. Other memory access technologies and techniques may be used and are still considered to be within the scope of the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

Further, the use of the terms "first," "second," "third," "fourth," and the like is to distinguish between repeated instances of a component or a step in a process and does not impose a serial or temporal limitation unless specifically stated to require such serial or temporal order.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to detect non-volatile (NV) write request sequences, the method comprising:
   receiving a write request that identifies data be written to a solid-state device that includes non-volatile memory;
   determining whether the write request is part of a NV write request sequence that includes a plurality of write requests or is not part of the NV write request sequence;
   in response to a determination that the write request is part of the NV write request sequence, associating the write request with the NV write request sequence, wherein data associated with the NV write request sequence is written to the non-volatile memory; and
   in response to a determination that the write request is not part of the NV write request sequence, writing the data identified by the write request to a cache that is coupled to the non-volatile memory.

2. The method of claim 1, wherein determining whether the write request is part of the NV write request sequence comprises determining whether the write request is part of a sequence of write requests that specify contiguous memory locations.

3. The method of claim 1, wherein determining whether the write request is part of the NV write request sequence comprises determining whether the write request is part of a sequence of write requests that specify a size of contiguous memory locations that is larger than a specific size.

4. The method of claim 1, wherein determining whether the write request is part of the NV write request sequence comprises determining whether the write request is part of a sequence of write requests that are received within a particular time and that specify contiguous memory locations.

5. The method of claim 1, wherein determining whether the write request is part of the NV write request sequence comprises:
   determining a time interval between receipt of the write request and a previous write request that specifies a contiguous memory location; and
   in response to the time interval being determined to be less than a threshold, associating the write request with the previous write request.

6. The method of claim 1, further comprising:
   storing a time when the write request is received;
   storing at least one of a start address of the write request or an end address of the write request; and
   using the time and the at least one of the start address or the end address of the write request to determine whether the write request is part of the NV write request sequence.

7. The method of claim 1, further comprising temporarily storing information related to write requests that specify contiguous memory locations in a memory before determining whether the write request is part of the NV write request sequence that includes the plurality of write requests or is not part of the NV write request sequence.

8. The method of claim 7, further comprising removing the information from the memory in response to a determination that a size of the contiguous memory locations of the write requests is larger than a specific size and a determination that the write request is part of the NV write request sequence.

9. The method of claim 1, wherein writing the data identified by the write request to the cache includes writing the data to a dynamic random-access memory (DRAM).

10. A solid-state device, comprising:
    an interface that is configured to receive a plurality of write requests;
    a cache;
    one or more non-volatile memories coupled to the cache; and
    a controller, coupled to the interface, the cache, and the one or more non-volatile memories, wherein the controller is configured to:
       receive the plurality of write requests from the interface,
       identify that one or more write requests of the plurality of write requests are part of a non-volatile (NV) write request sequence, write data associated with the one or more write requests identified to be part of the NV write sequence to the one or more non-volatile memories, and write data associated with one or more other write requests, of the plurality of write requests and which are identified to not be part of the NV write sequence, to the cache.

11. The solid-state device of claim 10, further comprising one or more queues coupled to the controller, wherein the one or more queues are configured to store the plurality of write requests before the controller identifies that the one or more write requests are part of the NV write request sequence or that the one or more other write requests are not part of the NV write request sequence.

12. The solid-state device of claim 10, wherein to identify that the one or more write requests are part of the NV write request sequence, the controller is configured to associate the one or more write requests that are part of a sequence of write requests that specify contiguous memory locations.

13. The solid-state device of claim 12, wherein to identify that the one or more write requests are part of the NV write request sequence, the controller is configured to determine that the data associated with the one or more write requests is over a specific size.

14. The solid-state device of claim 10, wherein to identify that the one or more write requests are part of the NV write request sequence, the controller is configured to:
identify a portion of the plurality of write requests that are received within a particular time period, and
identify associated write requests, from the portion of the plurality of write requests received within the particular time period that specify contiguous memory locations.

15. The solid-state device of claim 10, wherein the one or more non-volatile memories include one or more flash memories.

16. The solid-state device of claim 10, wherein the cache includes a dynamic random-access memory (DRAM).

17. A non-transitory computer-readable medium that includes computer-executable instructions stored thereon which, in response to execution by a computer, cause the computer to perform or control performance of operations to:

determine that a write request to a non-volatile memory is part of a non-volatile (NV) write request sequence by execution of actions, including two or more of to:
determine whether the write request is part of a sequence of write requests that specify contiguous memory locations,
determine whether the write request is received within a specific time period from an adjacent write request that has an end address that is contiguous to a start address of the write request, and
determine whether data associated with the sequence of write requests is larger than a size threshold; and
in response to the determination that the write request is part of the NV write request sequence, write data associated with the write request to the non-volatile memory; and
in response to a determination that the write request is not part of the NV write request sequence, write the data associated with the write request to a cache that is coupled to the non-volatile memory.

18. The non-transitory computer-readable medium of claim 17, further comprising computer-executable instructions stored thereon which, in response to execution by the computer, cause the computer to perform of control performance of at least one operation to:
store the data associated with the write request in a memory separate from the cache and the non-volatile memory.

19. The non-transitory computer-readable medium of claim 18, further comprising computer-executable instructions stored thereon which, in response to execution by the computer, cause the computer to perform of control performance of at least one operation to:
remove the data associated with the write request from the memory in response to the determination that the write request is either part of the NV write request sequence or is not part of the NV write request sequence.

20. The non transitory computer-readable medium of claim 17, wherein the non-volatile memory includes a flash memory and the cache includes a random-access memory (RAM).

* * * * *